United States Patent
You et al.

(10) Patent No.: US 11,177,530 B2
(45) Date of Patent: Nov. 16, 2021

(54) BATTERY PACK

(71) Applicant: LG CHEM, LTD., Seoul (KR)

(72) Inventors: Jung Been You, Daejeon (KR); Jeong Pyo Kong, Daejeon (KR); Sangyoon Jeong, Daejeon (KR); Jonghwa Choi, Daejeon (KR); Hui Jeong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 84 days.

(21) Appl. No.: 16/678,631

(22) Filed: Nov. 8, 2019

(65) Prior Publication Data

US 2020/0176739 A1  Jun. 4, 2020

(30) Foreign Application Priority Data

Dec. 4, 2018 (KR) .......................... 10-2018-0154613

(51) Int. Cl.
*H01M 50/24* (2021.01)
*H01M 50/502* (2021.01)

(52) U.S. Cl.
CPC ......... *H01M 50/24* (2021.01); *H01M 50/502* (2021.01); *H01M 2220/20* (2013.01)

(58) Field of Classification Search
CPC .... H01M 50/00; H01M 50/24; H01M 50/502; H01M 50/296; H01M 50/505; H01M 50/258; H01M 10/425; H01M 2220/20; B60L 55/00; B60L 58/18; B60L 58/19; B60L 50/66
USPC ........................................................ 429/120
See application file for complete search history.

(56) References Cited

U.S. PATENT DOCUMENTS

| 7,667,432 | B2 * | 2/2010 | West ....................... B60L 58/18 |
| | | | 320/112 |
| 7,956,574 | B1 * | 6/2011 | West ................... H01M 50/502 |
| | | | 320/112 |
| 9,118,055 | B2 * | 8/2015 | Lee ........................ H01M 50/20 |
| 10,309,403 | B2 * | 6/2019 | Hwang ............... F04C 18/0215 |
| 10,811,869 | B2 * | 10/2020 | Pevear ............. H01M 10/0525 |
| 2007/0252556 | A1 * | 11/2007 | West ..................... B60L 3/0046 |
| | | | 320/116 |
| 2009/0274956 | A1 * | 11/2009 | Kosugi ............... H01M 50/502 |
| | | | 429/158 |

(Continued)

FOREIGN PATENT DOCUMENTS

| JP | 2008-166008 A | 7/2008 |
| JP | 2012-33464 A | 2/2012 |

(Continued)

*Primary Examiner* — Milton I Cano
*Assistant Examiner* — Suphia Quraishi
(74) *Attorney, Agent, or Firm* — Birch, Stewart, Kolasch & Birch, LLP

(57) ABSTRACT

A battery pack which includes a plurality of battery modules, each battery module including a plurality of battery cells. Electrode leads extend from the plurality of battery cells; a connection member connects with at least one of the electrode leads; a bus bar electrically connects neighboring battery modules, and one end thereof contacts the connection member. An insulation member covers a contact portion of the connection member and the bus bar; and a flame spread blocking member overlaps the contact portion of the connection member and the bus bar, while being disposed on the insulation member.

17 Claims, 8 Drawing Sheets

(56) References Cited

U.S. PATENT DOCUMENTS

| | | | |
|---|---|---|---|
| 2010/0297482 A1* | 11/2010 | Yoon | H01M 50/20 429/61 |
| 2011/0151314 A1* | 6/2011 | Ogawa | H01M 10/613 429/158 |
| 2011/0287298 A1* | 11/2011 | Park | H01M 50/20 429/156 |
| 2012/0082876 A1* | 4/2012 | Yamamoto | H01M 10/482 429/90 |
| 2012/0183820 A1* | 7/2012 | Yoon | H01M 50/258 429/61 |
| 2013/0224548 A1* | 8/2013 | Choi | H01M 10/0481 429/99 |
| 2013/0236751 A1* | 9/2013 | Seong | H01M 50/20 429/61 |
| 2014/0011058 A1* | 1/2014 | Adachi | B60L 3/0046 429/61 |
| 2014/0017538 A1* | 1/2014 | Nakamori | H01M 50/20 429/99 |
| 2014/0030566 A1* | 1/2014 | Lee | H01M 50/20 429/90 |
| 2014/0134884 A1* | 5/2014 | Okamoto | B60L 58/10 439/627 |
| 2014/0272508 A1* | 9/2014 | Musetti | H01M 50/20 429/99 |
| 2015/0280185 A1* | 10/2015 | Lampe-Onnerud | H01M 50/20 429/9 |
| 2016/0133890 A1* | 5/2016 | Lee | H01M 10/647 429/72 |
| 2016/0190666 A1* | 6/2016 | Hoshino | H01M 10/6571 429/120 |
| 2016/0336578 A1* | 11/2016 | Mack | B60L 50/15 |
| 2017/0005371 A1* | 1/2017 | Chidester | B60L 15/20 |
| 2017/0170439 A1* | 6/2017 | Jarvis | H01M 50/3425 |
| 2017/0214103 A1* | 7/2017 | Onnerud | H01M 50/24 |
| 2018/0097322 A1* | 4/2018 | Harris, III | H01M 50/502 |
| 2018/0145292 A1* | 5/2018 | Lampe-Onnerud | H01M 50/112 |
| 2018/0194235 A1* | 7/2018 | Kim | H01M 50/502 |
| 2018/0241020 A1* | 8/2018 | Lampe-Onnerud | H01M 50/24 |
| 2018/0248159 A1* | 8/2018 | Kim | H01M 10/425 |
| 2018/0248166 A1* | 8/2018 | Ryu | H01M 50/20 |
| 2018/0269435 A1* | 9/2018 | Lee | H01M 50/502 |
| 2018/0269454 A1* | 9/2018 | De Souza | H01M 50/502 |
| 2018/0309281 A1* | 10/2018 | Ichikawa | H01M 50/502 |
| 2019/0020079 A1* | 1/2019 | Lee | H01M 10/613 |
| 2019/0036101 A1* | 1/2019 | Tyler | H01M 50/502 |
| 2019/0051882 A1* | 2/2019 | Nakayama | H01M 50/502 |
| 2019/0341585 A1* | 11/2019 | Shi | H01M 10/615 |
| 2020/0014005 A1* | 1/2020 | Lee | H05K 1/189 |
| 2020/0127249 A1* | 4/2020 | Yoon | H01M 10/643 |
| 2020/0168887 A1* | 5/2020 | Yoo | H01M 50/581 |
| 2020/0176739 A1* | 6/2020 | You | H01M 50/502 |
| 2020/0203697 A1* | 6/2020 | Lee | H01M 50/502 |
| 2021/0083254 A1* | 3/2021 | You | H01M 50/20 |

FOREIGN PATENT DOCUMENTS

| | | | |
|---|---|---|---|
| JP | 2013-16429 A | 1/2013 | |
| KR | 10-2012-0081402 A | 7/2012 | |
| KR | 10-2013-0064031 A | 6/2013 | |
| KR | 10-2014-0008123 A | 1/2014 | |
| KR | 10-2016-00413111 A | 4/2016 | |
| KR | 20170103232 A * | 9/2017 | B60L 11/18 |
| WO | WO-2013021538 A1 * | 2/2013 | H01M 50/209 |
| WO | WO-2017150807 A1 * | 9/2017 | B60L 50/50 |

\* cited by examiner

Prior Art

BATTERY PACK

This application claims benefit under 35 U.S.C. § 119 to Korean application KR 10-2018-0154613, filed on Dec. 4, 2018, the entire contents of which are hereby expressly incorporated by reference.

TECHNICAL FIELD

The present invention relates to a battery pack, and more particularly, it relates to a battery back including a flame spread preventing member.

BACKGROUND ART

Rechargeable batteries having high application characteristics and electrical characteristics such as high energy density according to their products are widely applied to battery vehicles, hybrid vehicles, and electric power storage devices driven by electric driving sources as well as portable devices. These rechargeable batteries are attracting attention as new energy sources for improving environmentally-friendly and energy efficiency in that they do not generate any by-products of energy use as well as their primary merit, which can drastically reduce the use of fossil fuels.

The battery pack applied to the battery vehicle has a plurality of cell assemblies including a plurality of unit cells coupled in series to obtain high power. The unit cell can be repeatedly charged and discharged by electrochemical reaction between constituent elements, including positive and negative current collectors, separators, active materials, and electrolyte solutions.

Meanwhile, as the need for a large capacity structure increases, including the use of energy storage sources, a demand for battery packs having a multi-module structure in which a plurality of rechargeable batteries formed by assembling a plurality of battery modules coupled in series and/or in parallel with each other has increased.

In general, when a battery pack is formed by coupling a plurality of battery cells in series or in parallel, a battery module formed of at least one battery cell is formed first, and other constituent elements are added by using the at least one battery module, thereby forming a battery pack.

The rechargeable battery has a variety of combustible materials, and thus there is a risk of overheating, explosion, and the like due to overcharge, overcurrent, and physical external impacts, and accordingly, it has a large drawback in terms of safety. Accordingly, in the case of a battery module or battery pack including a plurality of such rechargeable batteries, a battery management system (BMS) may be used to safely and efficiently manage the battery.

However, in spite of such a method, a fire may occur inside the battery pack due to impact, abnormal operation of the internal battery cell, failure of control by the BMS, and the like from the outside.

In the event of a fire inside the battery pack, insulation coating of wires present therein may be lost due to a high temperature flame. In this case, when a wire that has lost its insulation is in direct contact with other parts inside the battery pack, for example, a conductive part such as metal or a battery cell, leakage or short-circuit of high voltage current may occur, which eventually accelerates the fire inside the battery pack.

Conventional battery packs mainly use wires coated with an insulation member of a plastic material, and the insulation member has a melting point of about 300 degrees Celsius, so when exposed to a high temperature flame, the coating is melted, which causes loss of an insulation function, such that the fire is accelerated.

In order to prevent such a problem, there have been attempts to additionally install a safety member for preventing fire in the battery pack, but in this case, although the effect of fire protection is somewhat effective, the energy density of the battery pack decreases and the internal wiring becomes complicated, thereby causing deterioration of assembly processability.

Therefore, there is a high need for a technology capable of minimizing the energy density reduction of the battery pack, keeping the wiring concise, and improving the stability of the battery pack by preventing the acceleration of the fire even if a fire occurs therein.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a battery pack in which a flame generated from at least one battery module does not affect a peripheral part.

However, the problems to be solved by the embodiments of the present invention are not limited to the above-mentioned problems, but can be variously extended within the scope of the technical idea included in the present invention.

Technical Solution

A battery pack has a plurality of battery modules, each battery module including a plurality of battery cells according to an exemplary embodiment of the present invention, electrode leads extend from the plurality of battery cells; a connection member connects with at least one of the electrode leads; a bus bar electrically connects neighboring battery modules, and one end thereof contacts the connection member. An insulation member covers a contact portion of the connection member and the bus bar; and a flame spread blocking member overlaps the contact portion of the connection member and the bus bar, while being disposed on the insulation member.

The insulation member may contact the bus bar at a portion where the contact portion of the connection member and the bus bar are overlapped with the insulation member.

The plurality of battery modules may include a first battery module and a second battery module that neighbor each other, the bus bar may contact a connection member of each of the first battery module and the second battery module, the flame spread blocking member may include a first flame spread blocking member disposed at a portion where the connection member and the bus bar of the first battery module contact each other, and a second flame spread blocking member that is disposed at a portion where the connection member and the bus bar of the second battery module contact each other, and the first flame spread blocking member and the second flame spread blocking member may be separated from each other.

The connection member may be mounted on the entire surface of a bus bar frame, and may be connected with at least one of the electrode leads passed through a plurality of lead slots of the bus bar frame.

The flame spread blocking member may be formed of a mica tape or a mica sheet.

Each of the plurality of battery modules may be mounted in a metal case.

The plurality of battery modules may be coupled in series, and two flame spread blocking members may be provided in each of the battery modules.

The flame spread blocking member of the battery module may include a first flame spread blocking member and a second flame spread blocking member, and the first flame spread blocking member may be formed at a first end of the battery module and the second flame spread blocking member may be formed at a second end of the battery module.

The plurality of battery modules may include a first battery module, a second battery module, and a third battery module that neighbor each other, the first battery module, the second battery module, and the third battery module may be arranged in a direction that is perpendicular to a long side of each of the battery modules, the bus bar may include a first bus bar connecting the first battery module and the second battery module, a second bus bar connecting the second battery module and the third battery module, and a third bus bar connecting the third battery module and the first battery module, and the first bus bar, the second bus bar, and the third bus bar may be respectively formed along the alignment direction of the first battery module, the second battery module, and the third battery module. The first bus bar may be disposed at one end of each of the first battery module and the second battery module in the same direction, the second bus bar may be disposed at the other end of the second battery module, and the third bus bar may be disposed at the other end of the first battery module.

The first bus bar and the second bus bar each may have a convex shape in a direction facing each other in a plan view.

The flame spread blocking member may contact the insulation member.

The connection member may be formed of a copper or aluminum material.

The connection member may contact at least one of the electrode leads by welding.

The flame spread blocking member may continuously cover a top surface and a side surface of the insulation member.

A device according to another exemplary embodiment of the present invention includes the above-described battery pack.

Advantageous Effects

According to the exemplary embodiments, a battery pack including a flame spread blocking member formed in a portion where the flame can be directly exposed without increasing the energy density, can be implemented, and thus it is possible to prevent the battery module ignition from being promoted due to an external short circuit.

MODE FOR INVENTION

Figure 1:
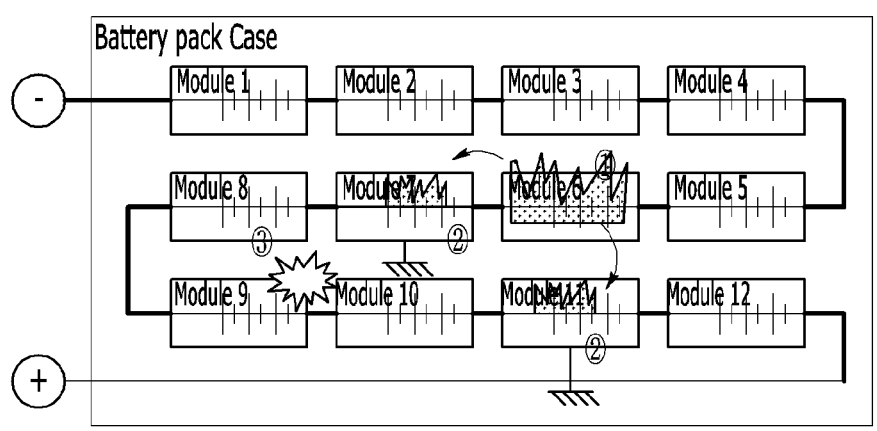
FIG. 1 is a schematic view of a path through which a flame generated from one battery module spreads to a peripheral part in a conventional battery pack.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, since sizes and thicknesses of the respective components shown in the accompanying drawings are arbitrarily shown for convenience of explanation, the present invention is not necessarily limited to contents shown in the accompanying drawings. In the drawings, the thickness of layers, films, panels, regions, etc., are exaggerated for clarity. In addition, in the accompanying drawings, thicknesses of some of layers and regions have been exaggerated for convenience of explanation.

It will be understood that when an element such as a layer, film, region, or substrate is referred to as being "on" another element, it can be directly on the other element or intervening elements may also be present. In contrast, when an element is referred to as being "directly on" another element, there are no intervening elements present. In addition, when an element is referred to as being "on" a reference element, it can be positioned on or beneath the reference element, and is not necessarily positioned on the reference element in an opposite direction to gravity.

In addition, unless explicitly described to the contrary, the word "comprise" and variations such as "comprises" or "comprising" will be understood to imply the inclusion of stated elements but not the exclusion of any other elements.

In addition, in this specification, the phrase "on a plane" means viewing a target portion from the top, and the phrase "on a cross-section" means viewing a cross-section formed by vertically cutting a target portion from the side.

FIG. 1 is a schematic view that shows a path through which a flame generated from a battery module spreads to a peripheral part in a conventional battery pack.

Referring to FIG. 1, a plurality of battery modules included in a battery pack case are illustrated, and when a flame occurs in the sixth battery module disposed in a middle thereof, insulation of the neighboring seventh battery module and the eleventh battery module is broken such that battery cells in the seventh battery module and battery cells in the eleventh battery modules may contact the battery pack case. Accordingly, an external short circuit of the seventh to eleventh battery modules may occur, thereby causing iterative generations of additional flame.

Figure 2:
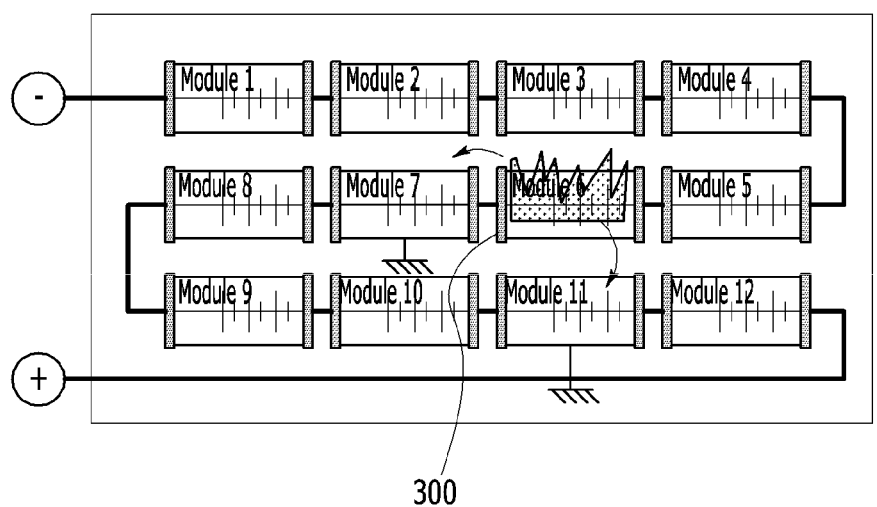
FIG. 2 is a schematic view that illustrates spread of a flame generated from one battery module to a peripheral part is prevented in a battery pack according to an exemplary embodiment of the present invention.

FIG. 2 is a schematic view illustrating that a flame generated from one battery module in a battery pack according to an exemplary embodiment of the present invention is blocked from being spread to a peripheral part.

Referring to FIG. 2, a flame spread blocking member 300 is formed in each battery module included in the battery pack according to the exemplary embodiment of the present invention. The flame spread blocking member 300 directly covers a terminal portion of each battery module such that a flame generated from a single battery module can be blocked from being directly spread to the next battery module. The flame spread blocking member 300 may be provided as a mica tape or a mica sheet.

Figure 3:
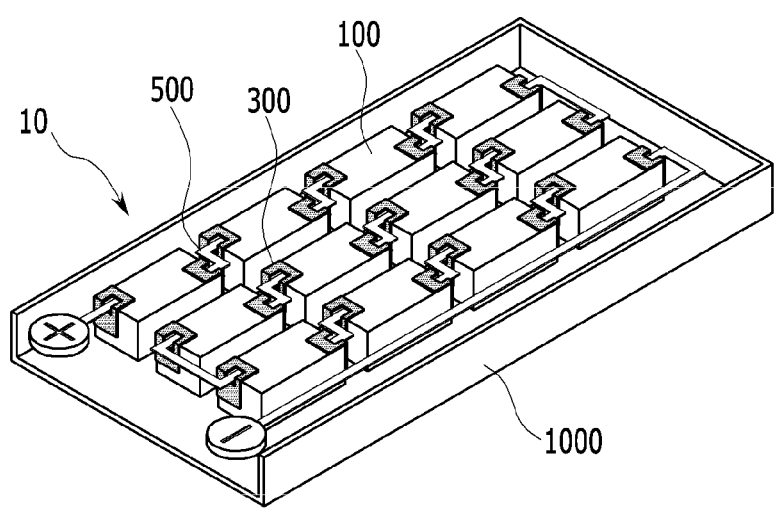
FIG. 3 is a perspective view of a connection structure of a plurality of battery modules in the battery pack according to the exemplary embodiment of the present invention.

FIG. 3 is a schematic perspective view of a connection structure of a plurality of battery modules in the battery pack according to the exemplary embodiment of the present invention.

FIG. 3 illustrates characteristics of the battery pack according to the exemplary embodiment of the present invention shown in FIG. 2 in detail. Referring to FIG. 3, a battery pack 10 includes a plurality of battery modules 100 installed in a pack case 1000. The pack case 1000 may be a metallic case formed of a metallic material. The battery modules 100 neighboring each other are electrically connected by a bus bar 500. The flame spread blocking member 300 according to the present exemplary embodiment is formed to cover opposite ends of the bus bar 500.

Figure 4:
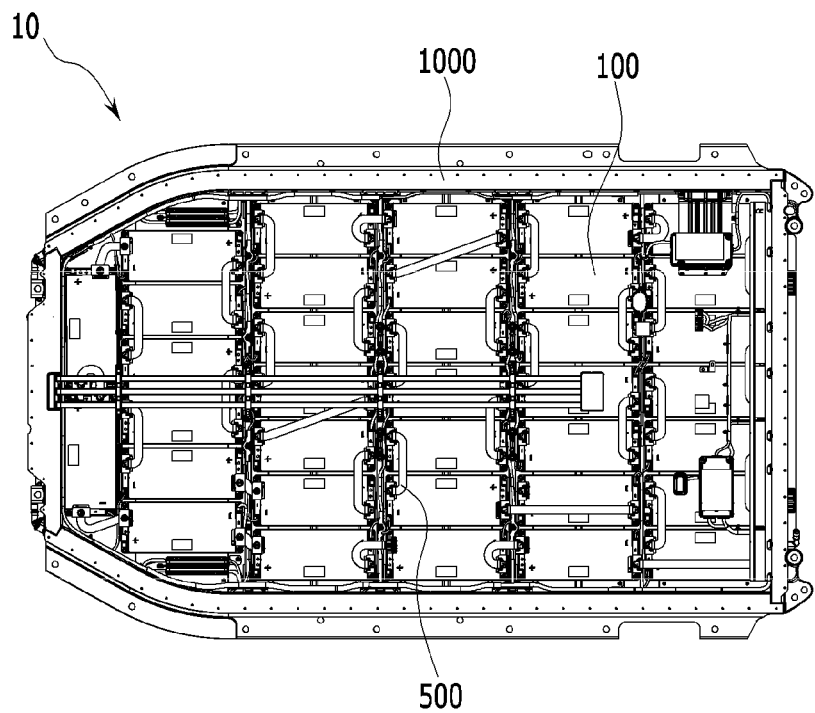
FIG. 4 is a top plan view illustrating a connection relationship of a plurality of battery modules included in a battery pack according to an exemplary embodiment of the present invention.
Figure 5:
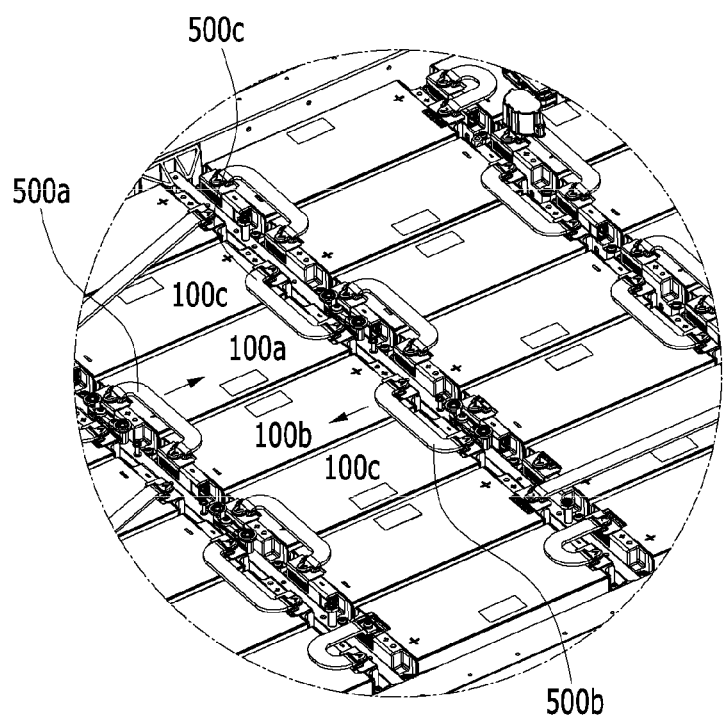
FIG. 5 is a partial perspective view illustrating a part of the battery pack of FIG. 4.
Figure 6:
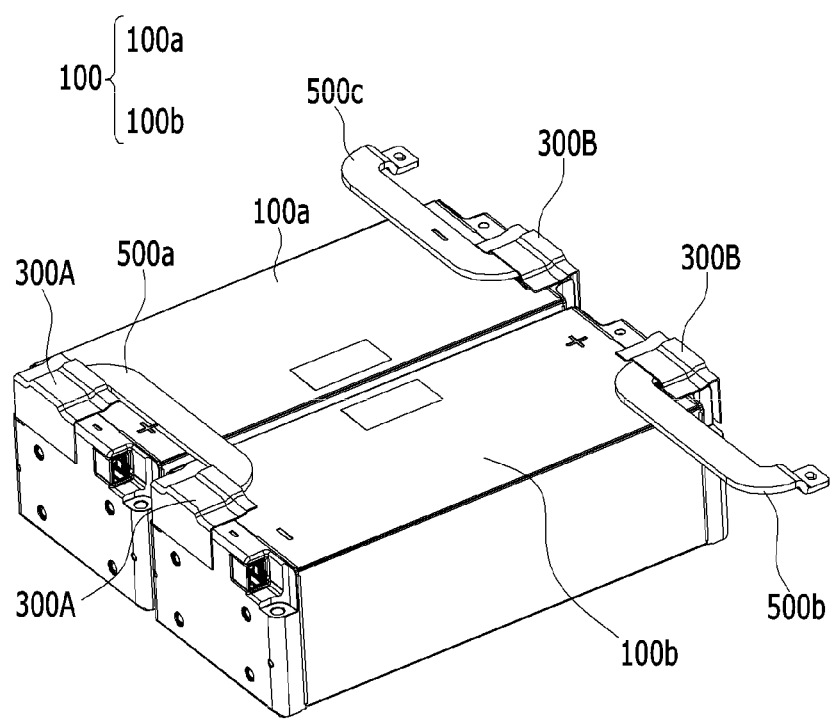
FIG. 6 is a perspective view of battery modules that neighbor in the battery pack according to the exemplary embodiment of FIG. 4 and FIG. 5.

FIG. 4 is a top plan view illustrating a connection relationship of a plurality of battery modules included in a battery pack according to an exemplary embodiment of the present invention. FIG. 5 is a partial perspective view illustrating a part of the battery pack of FIG. 4. FIG. 6 is a perspective view of battery modules that neighbor in the battery pack according to the exemplary embodiment of FIG. 4 and FIG. 5.

Referring to FIG. 4 to FIG. 6, a battery pack 10 according to the present exemplary embodiment includes a plurality of battery modules 100 mounted in a pack case 1000, which is formed of a metallic material. The plurality of battery modules 100 may be coupled in series. In this case, every two battery modules 100 may be provided with a flame spread blocking member 300. In addition, as shown in FIG. 6, the flame spread blocking member 300 of the battery module 100 include a first flame spread blocking member 300A and a second flame spread blocking member 300B, and the first flame spread blocking member 300A may be formed at one end of the battery module 100 and the second flame spread blocking member 300B may be formed at the other end of the battery module 100.

The plurality of battery modules 100 may include first battery modules 100a, second battery modules 100b, and third battery modules 100c, which neighbor each other. The first battery module 100a, the second battery module 100b, and the third battery module 100c may be arranged in a direction that is perpendicular to a long side of each of the battery modules. The first battery module 100a, the second battery module 100b, and the third battery module 100c form one battery module array, and such a battery module array may be iteratively aligned in a row direction and a column direction. The bus bar 500 may include a first bus bar 500a connecting the first battery module 100a and the second battery module 100b, a second bus bar 500b connecting the second battery module 100b and the third battery module 100c, and a third bus bar 500c connecting the third battery module 100c and the first battery module 100a. In this case, the first bus bar 500a, the second bus bar 500b, and the third bus bar 500c are formed along the alignment direction of the first battery module 100a, the second battery module 100b, and the third battery module 100c, and the first bus bar 500a may be disposed at one end of each of the first battery module 100a and the second battery module 100b in the same direction, the second bus bar 500b may be disposed at the other end of the second battery module 100b, and the third bus bar 500c may be disposed at the other end of the first battery module 100c.

According to the present embodiment, as shown by the arrows in FIG. 5, the first bus bar 500a and the second bus bar 500b may have convex shapes in the direction facing each other in a plan view of FIG. 4. In the battery pack 10 according to the present exemplary embodiment, the battery module array formed of the above-described first battery module 100a, second battery module 100b, and third battery module 100c may be aligned in a direction that is perpendicular to the long side of the battery module 100, and the battery modules 100 may be aligned in a row direction. Here, the row direction implies a direction in which the long side of the battery module 100 extends. In this case, the energy density may be increased by minimizing the volume of the battery pack 10 by narrowing the interval between neighboring battery modules 100 in the row direction as much as possible. In order to minimize the distance between neighboring battery modules 100 in the row direction as described above, the first bus bar 500a and the second bus bar 500b according to the present exemplary embodiment may have a structure in which they are disposed toward the center of the battery module 100 connected to the first bus bar 500a and the second bus bar 500b. That is, the first bus bar 500a and the second bus bar 500b may have convex shapes in the direction facing each other.

Figure 7:
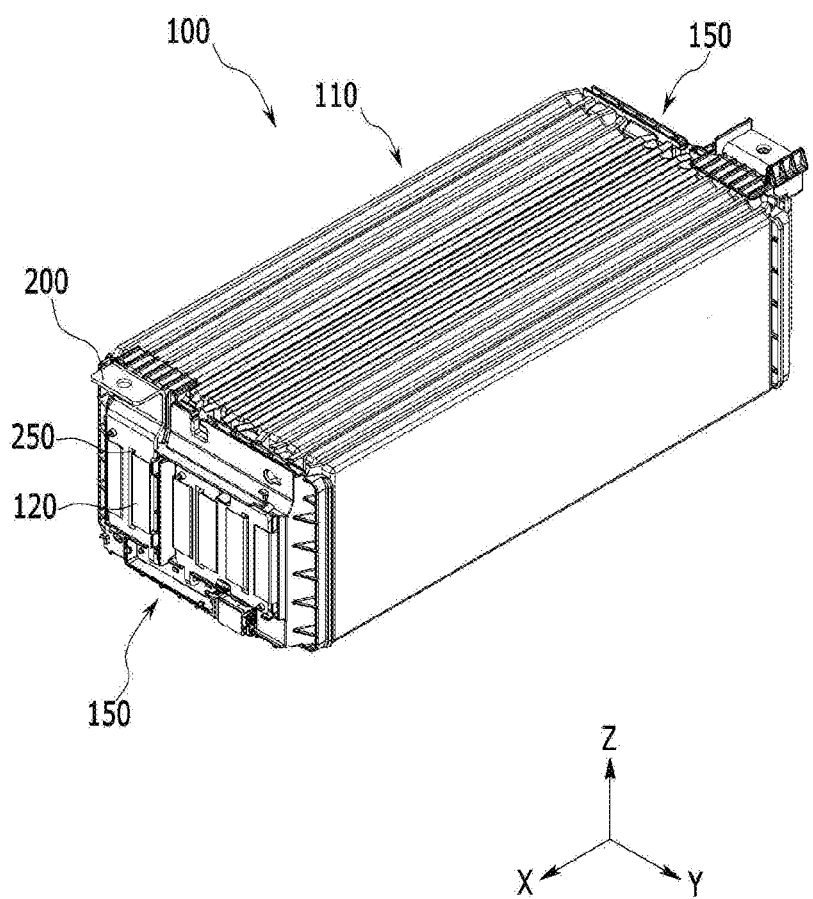
FIG. 7 is a perspective view illustrating one module case in the battery modules shown in FIG. 6.
Figure 8:
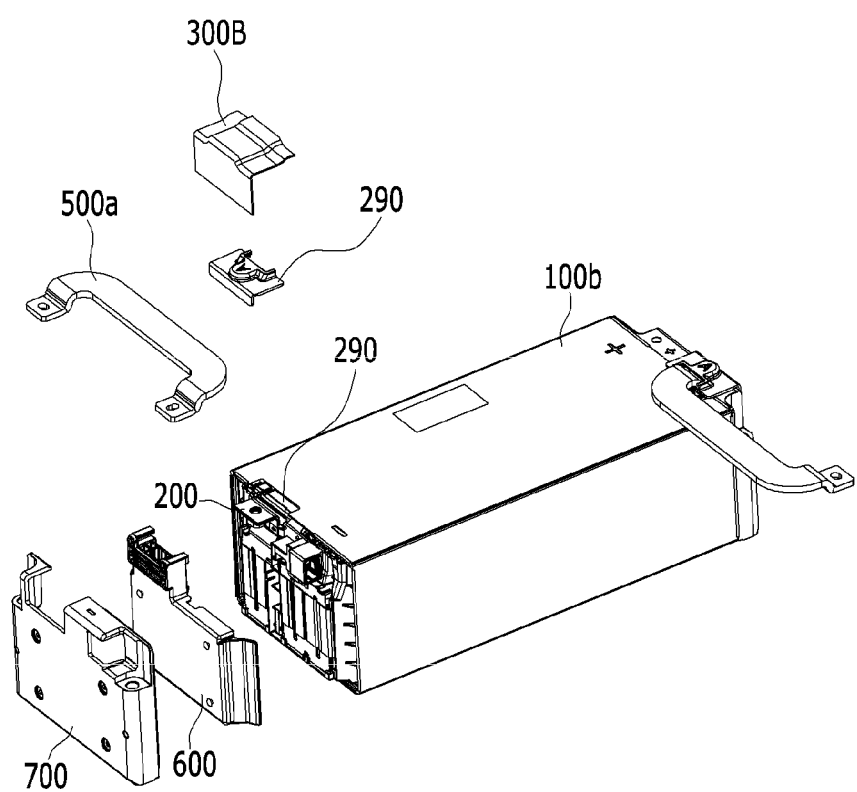
FIG. 8 is an exploded view of one of the battery modules shown in FIG. 6.

FIG. 7 is a perspective view illustrating that one module case in the battery modules shown in FIG. 6 is removed. FIG. 8 is an exploded view of one of the battery modules shown in FIG. 6.

Referring to FIG. 7, the battery module 100 according to the present exemplary embodiment may include a battery cell 110 and a bus bar frame 150. As a rechargeable battery, the battery cell 110 may be provided as a pouch-type rechargeable battery. Such a battery cell 110 may be provided in plural, and the plurality of battery cells 110 may be mutually stacked so as to be electrically connected with each other.

Each of the plurality of battery cells 110 may include an electrode assembly, a battery case, and an electrode lead 120. The electrode assembly may be formed of a positive plate, a negative plate, and a separator. Description of the electrode assembly is widely known, so a detailed description thereof will be omitted.

The electrode lead 120 may be electrically connected with the electrode assembly, and the electrode 120 may be provided as a pair in a single battery cell 110.

The bus bar frame 150 is provided to electrically connect the electrode leads 120 of the plurality of battery cells 110, and the bus bar frame 150 may cover the plurality of battery cells 110 in a protrusion direction (i.e., X-axis direction) of the electrode leads 120 of the plurality of battery cells 110. In this case, the bus bar frame 150 may be provided as a pair. Each of the pair of bus bar frames 150 may electrically connect the electrode leads 120 protruded in the X-axis direction of the plurality of battery cells 110, and cover electrode leads 120 provided in the −X axis direction of the plurality of battery cells 110 for electrical connection.

A plurality of lead slots 250 are formed in the bus bar frame 150, and the plurality of lead slots 250 may be disposed at a distance from each other along a Y-axis direction of the bus bar frame 150.

The lead slots 250 are openings through which the electrode leads 120 of the plurality of battery cells 110 pass, and may be formed along a Z-axis direction of the bus bar frame 150. The lead slot 250 enables electrode leads 120 of two battery cells 110 that are adjacent to each other to pass therethrough. That is, electrode leads 120 of two adjacent battery cells 110 may jointly pass through one lead slot 250.

A connection member 200 that is welded with at least one of the electrode leads 120 is coupled to the bus bar frame 150 according to the present exemplary embodiment. The connection member 200 may be formed of a copper or aluminum material. The connection member 200 may be mounted on the front side (X-axis direction) of the bus bar frame 150 and connected to at least one of the electrode leads 120 passing through the plurality of lead slots 250 of the bus bar frame 150.

The structure of the battery module 100 of FIG. 6 will now be described in detail with reference to an exploded view of FIG. 8.

Referring to FIG. 6 to FIG. 8, the plurality of battery cells 110 are mounted in a module case, the bus bar frames 150 are mounted at one end of each of the plurality of battery cells 110, and an insulation cover 600 may cover the bus bar frames 150. An end plate 700 is additionally formed at an outer side of the insulation cover 600 to protect the battery module 100 from external impact and the like.

One end of the bus bar 500 contacts the connection member 200, and the bus bar 500 may electrically connect neighboring battery modules 100.

The battery module according to the present exemplary embodiment includes an insulation member 290 that covers a contact portion of the connection member 200 and the bus bar 500, and a flame spread blocking member 300 that is disposed on the insulation member 290 and overlaps the contact portion of the connection member 200 and the bus bar 500. The insulation member 290 may contact the bus bar 500 at a portion where the contact portion between the connection member 200 and the bus bar 500 overlaps the insulation member 290. Conventionally, only the insulation member 290 exists in the portion where the bus bar 500 and the contact member 200 contact, and the insulation member 290 is formed of a plastic material. Thus, when the insulation member 290 is exposed to a high-temperature flame, the insulation member 290 is melted and loses an insulation function, thereby accelerating a fire. In particular, due to the loss of the insulation function of the insulation member 290, the pack case 1000 formed of a metallic material contacts the connection member 200 such that the pack case 1000 and battery cells in the pack case 1000 are short-circuited and battery cells of neighboring battery module are short-circuited, thereby causing a severe fire.

In the present exemplary embodiment, the flame spread blocking member 300 prevents the connection member 200 from contacting the pack case 1000, while facing the same due to the exposed insulation member 290. Therefore, a large explosion due to an external short-circuit between the pack case 1000 and the connection member 200, which is formed of the metal material, can be prevented.

Referring back to FIG. 6 and FIG. 7, the plurality of battery modules 100 include the first battery module 100a and the second battery module 100b which neighbor each other, and the bus bar 500 may contact the connection member 200 of each of the first battery module 100a and the second battery module 100b. The flame spread blocking member 300 may include a first flame spread blocking member 300A that is disposed in a contact portion of a connection member 200 and a bus bar 500 of the first battery module 100a, and a second flame spread blocking member 300B that is disposed in a contact portion of a connection member 200 and a bus bar 500 of the second battery module 100b. The first flame spread blocking member 300A and the second flame spread blocking member 300B may be separated from each other.

Referring to FIG. 6 and FIG. 8, the flame spread blocking member 300 according to the present exemplary embodiment may continuously cover an upper surface and a side surface of the insulation member 290. Such a structure can effectively prevent a flame from spreading to a peripheral module due to a fire in the battery module 100. In this case, the flame spread blocking member 300 may have a structure in which the flame spread blocking member 300 is spaced apart from or is in direct contact with the insulation member 290.

Hereinafter, in the battery pack structure manufactured according to the present exemplary embodiment and a battery pack structure according to a comparative example, an experimental result of igniting one battery module and determining whether the flame spreads to a peripheral module will be described.

Comparative Example

A battery pack in which a metal case covers a battery module in which only an insulation member formed of a plastic material is formed at a portion where a bus bar electrically connecting battery modules and a connection member connected with an electrode lead contact each other, was prepared. In such a battery pack structure, the battery cell was forced to undergo thermal runaway, and flame exposure was determined from the outside of the battery pack. For the thermal runaway, a heating pad was attached to the side of the battery cell and heated. In this case, a temperature of the battery cell was increased by 1 degree Celsius or more per second, and the battery cell temperature was eventually increased to 60 degrees Celsius or more. The thermal runaway test was used to measure the exposure time of the flame to the outside, and it was determined that it took about 2 minutes before the flame was exposed to the outside.

Example

As described above in the exemplary embodiment of the present invention, a battery pack in which the flame spread blocking member made of the mica tape was manufactured on the insulation member covering the contact portion of the connection member and the bus bar, and then the battery cell was forced to undergo thermally runaway. After that, it was determined whether or not flame exposure occurs at the outside of the battery pack. For the thermal runaway, a heating pad was attached to the side of the battery cell and heated. In this case, the temperature of the battery cell was increased by 1 degree Celsius or more per second and the battery cell temperature was eventually increased to 60 degrees Celsius or more. The thermal runaway test was used to measure the exposure time of the flame to the outside, and the result showed that the flame took about 20 minutes or more to be exposed to the outside.

The battery pack described above can be applied to various devices. The device may be applied to a vehicle such as an electric bicycle, an electric vehicle, or a hybrid vehicle, but the present invention is not limited thereto, and may be applied to various devices that can use a battery pack, and this is also included in the scope of the present invention.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

10: battery pack
100: battery module
200: connection member
290: insulation member
300: flame spread blocking member
500: bus bar
1000: pack case

The invention claimed is:

1. A battery pack, comprising:
a plurality of battery modules, each battery module including a plurality of battery cells;
electrode leads extending from the plurality of battery cells;
a connection member connected with at least one of the electrode leads;
a bus bar electrically connecting neighboring battery modules, and one end thereof contacts the connection member;
an insulation member that covers the connection member and the bus bar; and
a flame spread blocking member overlapping the connection member and the bus bar, while covering the insulation member.

2. The battery pack of claim 1, wherein the insulation member contacts the bus bar at a portion where the connection member and the bus bar are overlapped with the insulation member.

3. The battery pack of claim 2, wherein the plurality of battery modules comprise a first battery module and a second battery module that neighbor each other,
wherein the bus bar contacts a connection member of each of the first battery module and the second battery module,
wherein the flame spread blocking member comprises a first flame spread blocking member disposed at a portion where the connection member and the bus bar of the first battery module contact each other, and a second flame spread blocking member that is disposed at a portion where the connection member and the bus bar of the second battery module contact each other, and
wherein the first flame spread blocking member and the second flame spread blocking member are separated from each other.

4. The battery pack of claim 1, wherein the connection member is mounted on the entire surface of a bus bar frame, and is connected with at least one of the electrode leads passed through a plurality of lead slots of the bus bar frame.

5. The battery pack of claim 1, wherein the flame spread blocking member is formed of a mica tape or a mica sheet.

6. The battery pack of claim 1, wherein each of the plurality of battery modules is mounted in a metal case.

7. The battery pack of claim 1, wherein the plurality of battery modules are coupled in series, and two flame spread blocking members are provided in each of the battery modules.

8. The battery pack of claim 7, wherein the flame spread blocking member of the battery module comprises a first flame spread blocking member and a second flame spread blocking member, and the first flame spread blocking member is formed at a first end of the battery module and the second flame spread blocking member is formed at a second end of the battery module.

9. The battery pack of claim 8, wherein the plurality of battery modules comprise a first battery module, a second battery module, and a third battery module that neighbor each other,
wherein the first battery module, the second battery module, and the third battery module are arranged in a direction that is perpendicular to a long side of each of the battery modules,
wherein the bus bar comprises a first bus bar connecting the first battery module and the second battery module, a second bus bar connecting the second battery module and the third battery module, and a third bus bar connecting the third battery module and the first battery module, and
wherein the first bus bar, the second bus bar, and the third bus bar are respectively formed along the alignment direction of the first battery module, the second battery module, and the third battery module, the first bus bar is disposed at one end of each of the first battery module and the second battery module in the same direction, the second bus bar is disposed at the other end of the second battery module, and the third bus bar is disposed at the other end of the first battery module.

10. The battery pack of claim 9, wherein the first bus bar and the second bus bar each has a convex shape in a direction facing each other in a plan view.

11. The battery pack of claim 1, wherein the flame spread blocking member contacts the insulation member.

12. The battery pack of claim 1, wherein the connection member is formed of a copper or aluminum material.

13. The battery pack of claim 1, wherein the connection member contacts at least one of the electrode leads by welding.

14. The battery pack of claim 1, wherein the flame spread blocking member continuously covers a top surface and a side surface of the insulation member.

15. A device comprising the battery pack of claim 1.

16. The battery pack of claim 1, wherein the connection member is U-shaped and contacts two electrode leads,
wherein the insulation member covers a first end of the connection member and a second end of the connection member.

17. The battery pack of claim 1, wherein the flame spread blocking member contacts a top surface of one of the battery modules.

* * * * *